United States Patent [19]

Kebo

[11] Patent Number: 4,802,717
[45] Date of Patent: Feb. 7, 1989

[54] INFRARED AFOCAL ZOOM TELESCOPE

[75] Inventor: Reynold S. Kebo, Los Angeles, Calif.

[73] Assignee: Hughes Aircraft Company, Los Angeles, Calif.

[21] Appl. No.: 854,373

[22] Filed: Apr. 21, 1986

[51] Int. Cl.[4] ................... G02B 13/14; G02B 15/16
[52] U.S. Cl. ................................. 350/1.3; 350/1.2; 350/427; 350/560
[58] Field of Search ............... 350/1.2, 1.3, 560, 426, 350/427, 453, 462

[56]  References Cited

U.S. PATENT DOCUMENTS

| 3,825,315 | 7/1974 | Altman et al. | |
| 3,947,084 | 3/1976 | Noyes | 350/1.3 |
| 4,249,793 | 2/1981 | Uehara | 350/560 |
| 4,479,695 | 10/1984 | Neil | 350/1.3 |
| 4,486,069 | 12/1984 | Neil et al. | 350/1.2 |
| 4,632,498 | 12/1986 | Neil | 350/1.2 |

OTHER PUBLICATIONS

Roberts, "Compact Infrared Continuous Zoom Telescope", Optical Engineering, vol. 23, No. 2, Mar./Apr., 1984.
Jamieson, "Zoom Lenses for the 8u-13u Waveband", Optica Acta, vol. 18, No. 1 (1971).
Neil, "Zoom Lenses for the Thermal Infrared", Optical Systems Design, Analysis, and Production; vol. 339, Apr. 1983.
Neil, "Use of Chalcogenide Glass in Thermal Infrared Telescopes", SPIE, vol. 237, 1980 International Lens Design Conference (OSA).

Primary Examiner—John K. Corbin
Assistant Examiner—Martin Lerner
Attorney, Agent, or Firm—Ronald L. Taylor; W. J. Streeter; A. W. Karambelas

[57]  ABSTRACT

An afocal zoom lens system is provided that has particular utility for use in aircraft navigation systems where a unitary (1.0×) magnification power is desirable. Two embodiments are disclosed, the first providing an 8:1 magnification ratio with the second embodiment providing a 12:1 ratio. Both embodiments employ four lens groups including a front fixed objective lens (A,E), a second lens group including a negative zooming element (B,F), a third fixed group (C,G) and a fourth rear negative zooming element (D,H). In the highest magnification position, the lenses are arranged so that the front zooming element is positioned adjacent the positive lens of the third group to form a weak negative doublet. In the minimum magnification position, the front zoom element is widely separated from the third group to create an inverse telephoto Galilean form. The rear zoom element and aperture stop move together to maintain collimation of the output beam and to hold the diameter of the on-axis exit beam to a constant value.

19 Claims, 2 Drawing Sheets

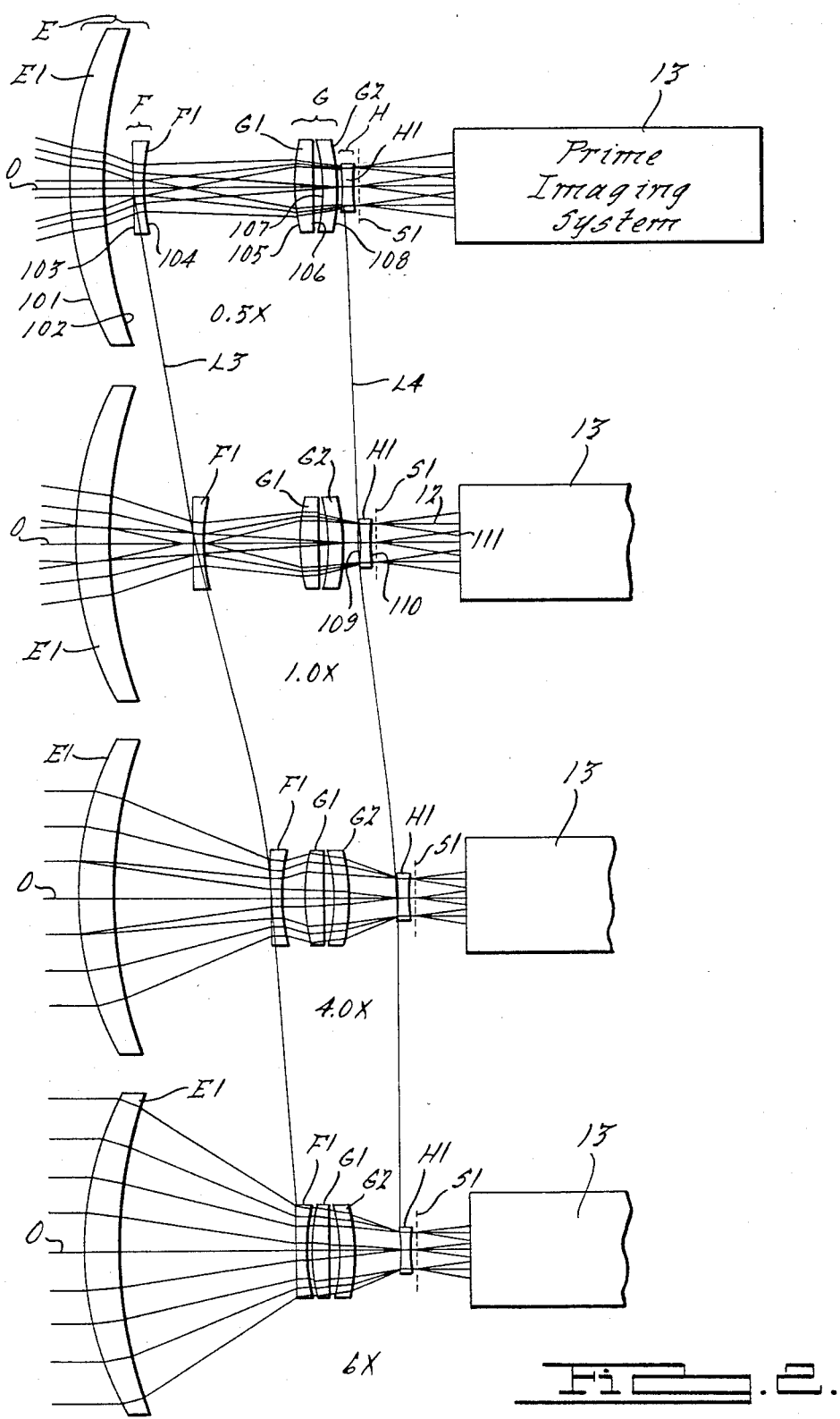

INFRARED AFOCAL ZOOM TELESCOPE

BACKGROUND OF THE INVENTION

1. Technical Field

This invention relates to afocal zoom lens systems and, more particularly, to such lens systems which are capable of operating in the infrared spectrum.

2. Description of Related Art

There are many applications for optical lens systems capable of operating in the infrared spectrum. For purposes of this invention, the term "infrared" means electromagnetic radiation having a wavelength longer than visible radiation and shorter than microwave radiation. The numerical wavelength range of the infrared spectrum is usually considered to extend from 0.7 microns which is the longest visible wavelength to substantially 100 microns. Infrared lens systems can be used as part of a night viewing surveillance device, an aircraft navigation device used to provide all-weather and night flying capabilities, as well as known infrared radar and imaging systems. One such system is generally referred to by the acronym "FLIR" derived from the words "forward looking infrared". These systems are preferably operated in the 2-20 micron wavelength region of the spectrum, more particularly to the 8-12 micron range.

It is often desirable to provide a zoom lens system that is capable of operating in the infrared spectrum. Such a zoom system can be used as a "bolt on" attachment to a primary imaging system such as that encountered in conventional FLIR systems. Typically, the zoom system must be of the afocal type wherein the output of the zoom is a collimated beam of energy focused at infinity. Among the desirable design parameters is that the afocal infrared zoom provides small transmission losses while at the same time providing usefully high image quality. Transmission losses are particularly acute with lenses having a spectral bandpass in the infrared region. Consquently, both from a cost and performance standpoint the number of lenses must be kept to a minimum. In addition, a compact design is also highly desirable.

Most of the previously known zoom systems, even in the visible wavelength region, are of the finite focus or image forming output type rather than of the afocal or attachment type intended for use with a prime focusing lens. U.S. Patents typical of this image forming type at visible wavelengths include U.S. Pat. No. 3,377,119 to Takano; U.S. Pat. No. 3,433,559 to Vockenhuber et al; U.S. Pat. No. 3,454,321 to Klein; and U.S. Pat. No. 3,597,048 to Bertele. Focusing lens systems intended for use at infrared wavelengths are shown in U.S. Pat. Nos. 3,439,969 to Kirkpatrick and 3,825,315 to Altman et al.

In more recent years the increasing use of far-infrared (8-12 microns) scanning systems have led to more development in the area of infrared afocal telescopes with variable magnification, i.e., zoom lens systems. Variable magnification or zoom telescopes have been designed and manufactured, but most have been limited in use due to their excessive physical size. Other constraints on the use of such lenses have been their mechanical complexity and difficulty in attaining both their theoretical optical design performance and their required mechanical reliability.

An excellent review of infrared zoom lens development is found in Neal, "Zoom Lenses for the Thermal Infrared", Optical Systems Design, Analysis, and Production; Volume 339, April of 1983. In that paper, the author discusses a design disclosed in U.S. Pat. No. 3,947,084 to Noyes that provided a 6:1 zoom ratio but unfortunately was not of a particularly short overall length. This zoom system utilizes a mechanically compensated zoom objective system and a two element eyepiece system between which an internal real image is produced. The zoom objective system which contains two separate nonlinear zooming components has the disadvantage of requiring the zoom component which is adjacent to the image to travel close to the real image. The zoom construction disclosed in this patent employed a re-imaging afocal zoom construction as compared to a Galilean type where the real image is not formed internally of the lens system.

Later, a more compact telescope design which provided a 4:1 zoom ratio was described in Roberts, "Compact Infrared Continuous Zoom Telescope", Optical Engineering, Vol. 23, No. 2, March/April 1984. Disclosed therein is a telescope formed by a mechanically compensated zoom objective system and a three-element eyepiece system. Although this design provided an improvement over previous zoom telescopes, the overall length required further shortening and apart from there being only a medium sized zoom range, the low magnification did not offer a particularly wide field of view. Other publications referring generally to the infared zoom technological area include Jamieson, "Zoom Lenses for the 8u-13u Waveband", Optica Acta, Vol. 18, No. 1, (1971).

In addition to the design objectives noted above there exists a need for an infrared zoom lens system capable of providing continuous-in focus view of a scene (i.e., afocal type), with the zoom lens being capable of a relatively large magnification ratio of at least 8:1 while also providing the capability of providing a unit magnification power (1.0X) mode of operation while at the same time providing a compact structure. The capability to provide a unit power zoom position is important for navigation applications which require the displayed scene to correspond exactly to the actual scene the pilot would see with direct viewing. The unit power zoom position would provide the pilot with the exact field of view necessary to fly his aircraft. Still other applications for an infrared afocal zoom lens system with these capabilities will become apparent to those skilled in the art.

SUMMARY OF THE INVENTION

Pursuant to the present invention, a compact infrared zoom lens system is provided with at least an 8:1 magnification ratio which includes a unit power (1.0X) mode of operation. The zoom telescope consists of optical elements having a spectral bandpass in the infrared spectrum arranged in a Galilean form in the highest magnification position and in an inverse telephoto Galilean form in the minimum magnification position.

In the preferred embodiment the zoom system is achieved by providing four optically coacting lens groups arranged along an optical axis to form the system. Each of the groups comprises at least one lens. The first group includes a fixed focus front objective element; the second group is a negative zoom element; the third group includes a positive fixed lens; and the fourth group is a rear negative zoom element. Means are provided to movably mouth these second and fourth lens groups so as to continuously vary the magnification of the system between minimum and maximum limits. At the minimum magnification the groups of lenses are arranged with respect to each other so that the negative front zoom element and positive third group are widely separated to create an inverse telephoto objective. At the maximum magnification the front negative zoom element and the positive fixed element of the third group combine to create a weak negative doublet in a Galilean form. The rear zoom element and the aperture stop are moved together to maintain collimation of the output beam and to hold the diameter of the on-axis exit beam to a constant value.

BRIEF DESRIPTION OF THE DRAWINGS

The various advantages of the present invention will become apparent to those skilled in the art by reading the following specification and by reference to the drawings in which:

FIG. 1 is an optical schematic view of an 8:1 zoom lens system showing the lens element of the system in various positions between minimum and maximum magnifications and indicating the loci or zoom track of the moveable lenses between these two positions; and FIG. 2 is a view similar to FIG. 1 for a second embodiment of the invention which provides a 12:1 magnification ratio.

DESCRIPTION OF THE PREFERRED EMBODIMENT

Figure 1:
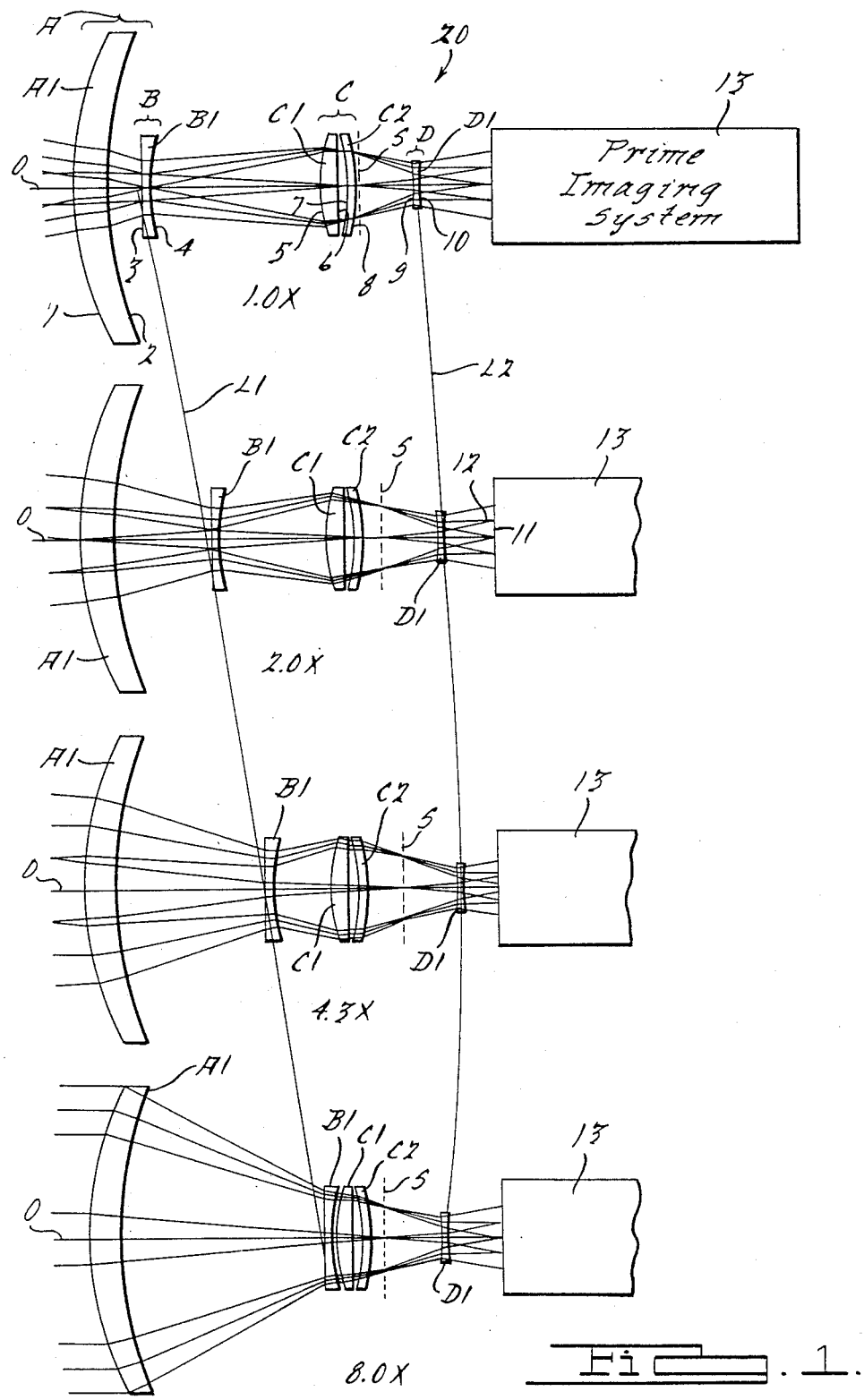

There is shown in FIG. 1 an optical schematic diagram of an 8:1 ratio afocal zoom telescope for use in the infrared spectrum. The present invention finds particular utility in the wavelength range between 8 and 12 microns. The zoom telescope is generally designated by the numeral 20 and comprises four optically coacting lens groups, A, B, C and D arranged along an optical axis O to form a mechanically compensated zoom system. The first lens group A consists of a single positive or condensing germanium lens A1 having surfaces 1 and 2 which form a singlet fixed objective lens. The second group B, which moves along a first locus L1, comprises a single negative or diverging germanium lens B1 with surfaces 3 and 4. This optical element is sometimes referred to herein as the front zoom element. Lens group C is a doublet consisting of germanium positive meniscus lens C1 having surfaces 5 and 6 and a zinc selenide negative meniscus lens C2 having surfaces 7 and 8. The zinc selenide lens C2 is used to correct for chromatic aberrations and its focal length is approximately minus 10 times in relationship to lens C1 so that the combination provides a converging or positive action for group C. Lens group D is formed of a germanium negative lens D1 and has surfaces 9 and 10. Lens group D moves along a locus L2 and is sometimes referred to herein as the rear zoom element.

The zooming action of the two moving lens groups B and D is controlled by a conventional cam mechanism so that both groups are always at the same magnification value point along their respective loci. Their motion between such points results in a continuous change in system magnification from 1.0X minimum to 8.0X maximum. The field of view in object space varies correspondingly from 14.6°×19.5° in the minimum magnification position to 1.9°×2.5° in the maximum magnification position. For all zoom positions, the diameter of the on-axis exit beam (bearing reference numeral 12) remains constant, as does the exit field of view which is 15°×20°. The interface surface between the afocal telescope and the prime imaging system is indicated by numeral 11.

The first three lens groups A, B and C can be thought of as cooperating to form a compound objective lens system for the telescope while the later lens group D is used as a recollimating lens. In the low magnification position such as shown at the top of FIG. 1, the lens group B is positioned close to the main objective lens A. Thus, the lens groups A, B, C and D each are located in positions that create an inverse telephoto Galilean form. By inverse telephoto Galilean form, it is meant that a positive compound inverse telephoto objective lens is combined with a negative recollimating lens to form a Galilean or non-reimaging telescope. This is created in the position shown in the 1.0X magnification schematic of FIG. 1 because the lens groups A, B and C form a compound objective whose focal length (1.89 inch) is less than the overall length of the zoom lens system, i.e., from surface 1 to surface 10. This overall length can be made as small as 10.554 inch in this embodiment.

In the embodiment of FIG. 1, the front zoom element, lens group B, moves in a linear path along loci L1 whereas the rear zoom element lens group D moves nonlinearly along loci L2. In the highest magnification position (8X in FIG. 1), the front negative zoom group B and the positive fixed lens C1 in group C combine to create a weak negative doublet. In order to create this weak negative doublet from lens group B and the positive lens C1, the focal length of group B must be smaller and of opposite sign in relationship to that of the positive lens C. The reciprocal of the focal length of the combination of lens in group B and lens C1 may be expressed as:

$$\frac{1}{f_T} = \frac{1}{f_B} + \frac{1}{f_{C1}} - d\left(\frac{1}{f_B}\right)\left(\frac{1}{f_{C1}}\right)$$

where d=THK 4, the airspace between lens group B and C1. Therefore, a lens group B should be at a minimum distance from the positive lens C1 in group C in order to reduce the effect of the airspace THK 4 on the focal length of the combination of lens group B and the positivie lens C1. In this embodiment, the focal length of lens group B is −2.205 inches, the focal length of the positive lens C1 is +2.545 and the airspace THK 4 is 0.098 inch. Thus, the lens groups A, B, C and D are arranged in a Galilean form wherein the combined focal length defined by lens groups A, B and C is longer than the length of the telescope lens system. In other words, in the largest magnification position, the image focal plane would lie to the right of lens group D in FIG. 1. The rear zoom element D and the aperture stop S are moved together to maintain collimation of the output beam and to hold the diameter of the on-axis exit beam to a constant value, which is about 1 inch in this embodiment. By spacing the aperture stop S away from the rear zoom element D it is believed that beam wander for a given objective diameter can be minimized. The distance that stop S should be spaced from surface 9 of lens group D is determined by the minimum clearance required between surface 8 of lens group C and stop S. In this embodiment the airspace between surface 8 and stop S has a minimum value of 0.1 inch at the minimum 1.0X magnification position. In this embodiment the distance that stop S is spaced from surface 9 of lens group D is 1.7659 inches.

The system of FIG. 1 is fabricated in accordance with the constructional data given in Table I below. In this Table it will be noted that lens group A in this embodiment comprises only the single lens A1 having surfaces 1 and 2. Lens group B comprises the lens B1 having surfaces 3 and 4. Similar notation is used throughout the table. The figures for the radii and all other magnitudes are given in inches. The radius refers to the radius of curvature of the particular surface specififed in accordance with conventional practice. The thickness refers to the distance along the optical axis O from the surface for which the thickness is stated to the next highest numbered surface. Thus, the thickness from surface 1 to surface 2 of lens A1 is 1.0 inch. The various thicknesses through air between the surface 2 of lens A1 and the surface 3 of lens B1 are given in Table II set forth below under the column headed THK 2. The various dimensions of thickness 2 corresponds to different magnification settings of the lens system along the locus L1 of the movement of lens group B. A similar notation is used for other fixed and variable distances. All of the lenses are germanium having an index of refraction of 4.003 except lens C2 which is zinc selenide having an index of refraction of 2.407. All of the lens surfaces are spherical except for surface 2 which is an ellipsoidal surface having a conic constant of minus 0.085256. The column heading labeled Clear Apert, according to conventional practice, refers to minimum clear apertures which is a parameter defining the diameter of the aperture which permits all radiation within the specified field of view to pass through the surface without vignetting.

TABLE I

| LENS/ SURFACE | RADIUS | THICKNESS | MAT'L | LENS O.D. | CLEAR APERT. |
|---|---|---|---|---|---|
| A1 | | | | | |
| 1 | 9.9246 | 1.0000 | Germanium | 10.00 | 9.82 |
| 2 | 13.5222 | THK 2 | air | | 9.37 |
| B1 | | | | | |
| 3 | 359.9160 | .2500 | Germanium | 3.20 | 2.85 |
| 4 | 6.4999 | THK 4 | air | | 2.74 |
| C1 | | | | | |
| 5 | 6.4999 | .4990 | Germanium | 3.20 | 2.77 |
| 6 | 40.9364 | .2450 | air | | 2.67 |
| C2 | | | | | |
| 7 | −12.2971 | .2500 | Zinc Selenide | 3.20 | 2.51 |
| 8 | −18.7744 | THK 8 | air | | 2.44 |
| stop | infinite | 1.7659 | air | 2.00 | 2.00 |
| D1 | | | | | |
| 9 | −5.3445 | .1200 | Germanium | 1.50 | 1.40 |
| 10 | −161.0850 | THK 10 | air | | 1.42 |
| 11 | infinite | Exit Interface Plane | | | |

TABLE II

| Magnification | Typical Zoom Spacings | | | |
|---|---|---|---|---|
| | THK 2 | THK 4 | THK 8 | THK 10 |
| 8× | 6.22513 | .09834 | .502676 | 1.7439 |
| 4.3× | 4.50180 | 1.82167 | 1.19211 | 1.0545 |
| 2.0× | 2.77848 | 3.54499 | .567035 | 1.6795 |
| 1.0× | 1.05515 | 5.26832 | .10000 | 2.1466 |

The embodiment shown in FIG. 2 is designed to provide a zoom or variable magnification range from 0.5X to 6.0X thereby providing a 12:1 ratio which also includes the desirable unitary (1.0X) magnification setting. This system has the same basic configuration of lens groups and design philosophy as the previous embodiment, but the lens prescription is different and the locii for both of the zoom elements are nonlinear. Some of the other characteristic differences is that the zoom telescope of this embodiment provides a wider field of view range which is 1.67°×2.22° in the highest magnification position and 20.5°×27.3° in the smallest magnification position. In the 6X position, the entrance pupil is 5.3 inches in diameter whereas the entrance pupil is 0.44 inch in diameter in the 0.5X or smallest magnification setting. In this later embodiment, the exit pupil is 0.88 inch with the exit field of view being 10.2°×13.6°.

As with the previous embodiment, the later embodiment includes four lens groups bearing reference labels of E, F, G and H. Lens groups F and H are zoom elements moving along loci L3 and L4, respectively. In this embodiment, the aperture stop S1 is shown mounted adjacent to the rear zooming element which provides acceptable results although the configuration of the previous embodiment is presently preferred. The prescription and relative zoom spacings are set forth in the following Tables III and IV, respectively. These tables follow the same convention as Tables I and II which were explained in detail above. In this latter embodiment, surface 102 is an ellipsoidal surface having a conic constant of minus 0.13882.

TABLE III

| LENS/ SURFACE | RADIUS | THICKNESS | MAT'L | LENS O.D. | CLEAR APERT. |
|---|---|---|---|---|---|
| E1 | | | | | |
| 101 | 7.8367 | .8165 | Germanium | 8.3 | 8.17 |
| 102 | 11.4951 | THK 102 | air | | 7.85 |
| F1 | | | | | |
| 103 | −29.0394 | .1995 | Germanium | 2.4 | 2.30 |
| 104 | 4.3489 | THK 104 | air | | 2.22 |
| G1 | | | | | |
| 105 | 4.3489 | .4459 | Germanium | 2.4 | 2.29 |
| 106 | 132.4470 | .1884 | air | | 2.22 |
| G2 | | | | | |
| 107 | −7.4114 | .3325 | Zinc Selenide | 2.4 | 2.09 |
| 108 | −10.3786 | THK 108 | air | | 2.01 |
| H1 | | | | | |
| 109 | −9.8314 | .3076 | Germanium | 1.1 | .93 |
| 110 | 11.6629 | THK 110 | air | 1 | .88 |
| 111 | infinite | Exit Interface Plane | | | |

TABLE IV

| Magnification | Typical Zoom Spacings | | | |
|---|---|---|---|---|
| | THK 102 | THK 104 | THK 108 | THK 110 |
| 6× | 4.2808 | .1064 | 1.1443 | 1.3618 |
| 4.0× | 3.7592 | .6280 | 1.2214 | 1.2846 |
| 1.0× | 1.9936 | 2.3936 | .4066 | 2.0995 |
| 0.5× | .7297 | 3.6575 | .1064 | 2.3997 |

In both embodiments there is provided a zoom telescope for use in the infrared spectrum that provides reasonable image quality especially at the outer magnification limits while at the same time achieving a unitary magnification setting (1.0X) with a few number of lenses. The unitary power setting enables the zoom telescope to be used in applications where it is desirable to have the displayed scene correspond exactly to the actual scene, such as in aircraft navigation applications. The telescope designs of the present invention also can be used as zoom lens attachments suitable for use with a prime imaging lens of fixed focal length represented in FIGS. 1 and 2 by the box 13 which are particularly suited for systems using infrared radiation in the 8–12 micron spectral region which is commonly used by FLIR systems and other infrared thermal imaging and scanning devices. All of these desirable features are achieved while also keeping to a minimum overall length zoom lens system which, as noted above, can be made as small as 6.784 inches in the second embodiment. Those who are skilled in this art will come to appreciate other advantages and that certain modifications can be made thereto after a study of the drawing specification and following claims.

What is claimed is:
1. An infrared afocal zoom telescope comprising:
 a first fixed positive lens group;
 a second fixed positive lens group spaced from the first lens group, said second fixed lens group comprising a doublet having a germanium positive meniscus lens and a zinc selenide meniscus lens;
 a front negative zoom lens disposed between the first and second fixed lens groups;
 a rear negative zoom lens disposed on an opposite side of the second fixed lens group; and
 means for mechanically compensating the telescope by moving the zoom lenses relative to each other between a first position defining a magnification power of at least 6X wherein the front zoom lens is disposed adjacent the positive meniscus lens of the second fixed lens group to form a weak negative lens group, with said means moving the zoom lenses to a second position defining a magnification power of at least unity or less wherein the front zoom lens is spaced from the positive meniscus lens of the second fixed lens group; and
 whereby the lenses are selected and arranged to prevent the formation of an image between the first lens group and said rear negative zoom lens.

2. The system of claim 1 wherein the first lens group includes a lens having a rear ellipsoidal surface.

3. The telescope of claim 1 which further includes an aperture stop mounted for movement with the rear zoom lens.

4. The telescope of claim 1 wherein the minimum magnification position provides a power of 0.5X and the minimum magnification position provides a power of 6.0X.

5. In an afocal zoom lens attachment for use with a prime imaging lens of a fixed focal length, the improvement comprising:
 four optically coacting lens groups arranged sequentially along an optical axis to form a zoom lens system, each of said groups comprising at least one lens, each of said lenses having a useful spectral bandpass in the infrared wavelength region, the first group being a single fixed focus and fixed position positive front objective lens the second group being a negative zooming singlet element moving in a first locus, the third group being fixed and comprising a doublet including a positive lens, one lens of the doublet providing chromatic aberration correction for the system, and the fourth group being a negative rear zooming singlet element moving in a second locus different from the first locus;
 mechanical compensating means to continuously vary the magnification of said system between minimum and maximum limits, adapted to simultaneously move said second and fourth group of zooming elements through said first locus and second locus, respectively, at least one locus being nonlinear; and
 said four groups of lenses when positioned to produce said minimum magnification of said system being arranged in relationship to each other so that the front zoom element is adjacent the fixed focus front objective element, and wherein said four groups of lenses when in the maximum magnification position being arranged so that the front zoom element of the second group is positioned adjacent the positive lens in the third group to form a weak negative doublet; and whereby the lenses are selected and arranged to prevent the formation of an image between the objective lens and the negative rear zooming element.

6. The zoom lens attachment of claim 5 wherein the lens groups are positionable so as to provide a unitary (1.0X) magnification power.

7. The zoom lens attachment of claim 6 which further includes an aperture stop mounted for movement with the rear zooming element of the fourth group to thereby maintain collimation of an output beam for the system and to hold the diameter of the on-axis exit beam to a constant value.

8. The zoom lens attachment of claim 5 wherein each of said lenses has a useful spectral bandpass for energy in the wavelength region between 8–12 microns.

9. The zoom lens attachment as in claim 8 wherein the four lens groups comprise the groups A, B, C and D are shown in FIG. 1 of the drawings and wherein said lenses are fabricated and mounted in accordance with the following prescription Tables I and II wherein the "radius" refers to the radius of curvature of the lens surface indicated by the corresponding number, the "thickness" refers to the distance along the optical axis O from the indicated surface to the surface of next higher number, and the materials and lens outer diameters are as specified, all of the surfaces being spherical except for the objective lens whose rear surface is ellipsoidal and has a conic constant of minus 0.085256, the measured quantities being stated in inches as follows:

TABLE I

| LENS/ SUR- FACE | RADIUS | THICK- NESS | MAT'L | LENS O.D. | CLEAR APERT. |
|---|---|---|---|---|---|
| A1 | | | | | |
| 1 | 9.9246 | 1.0000 | Germanium | 10.00 | 9.82 |
| 2 | 13.5222 | THK 2 | air | | 9.37 |
| B1 | | | | | |
| 3 | 359.9160 | .2500 | Germanium | 3.20 | 2.85 |
| 4 | 6.4999 | THK 4 | air | | 2.74 |
| C1 | | | | | |
| 5 | 6.4999 | .4990 | Germanium | 3.20 | 2.77 |
| 6 | 40.9364 | .2450 | air | | 2.67 |
| C2 | | | | | |
| 7 | −12.2971 | .2500 | Zinc Selenide | 3.20 | 2.51 |
| 8 | −18.7744 | THK 8 | air | | 2.44 |
| stop | infinite | 1.7659 | air | 2.00 | 2.00 |
| D1 | | | | | |
| 9 | −5.3445 | .1200 | Germanium | 1.50 | 1.40 |
| 10 | −161.0850 | THK 10 | air | | 1.42 |
| 11 | infinite | Exit Interface Plane | | | |

TABLE II

| Magnifi- cation | Typical Zoom Spacings | | | |
|---|---|---|---|---|
| | THK 2 | THK 4 | THK 8 | THK 10 |
| 8× | 6.22513 | .09834 | .502676 | 1.7439 |
| 4.3× | 4.50180 | 1.82167 | 1.19211 | 1.0545 |
| 2.0× | 2.77848 | 3.54499 | .567035 | 1.6795 |

TABLE II-continued

| Magnifi- | Typical Zoom Spacings | | | |
|---|---|---|---|---|
| cation | THK 2 | THK 4 | THK 8 | THK 10 |
| 1.0× | 1.05515 | 5.26832 | .10000 | 2.1466 |

10. The zoom lens attachment as in claim 8 wherein the four lens groups comprise the groups E, F, G and H as shown in FIG. 2 of the drawings and wherein said lenses are fabricated and mounted in accordance with the following prescription Tables III and IV wherein the "radius" refers to the radius of curvature of the lens surface indicated by the corresponding number, the "thickness" refers to the distance along the optical axis O from the indicated surface of the surface of next higher number, and the materials and lens outer diameters are as specified, all of the surfaces being spherical except for the objective lens whose rear surface is ellipsoidal and has a conic constant of minus 0.13882, the measured quantities being stated in inches as follows:

TABLE III

| LENS/ SUR- FACE | RADIUS | THICK- NESS | MAT'L | LENS O.D. | CLEAR APERT. |
|---|---|---|---|---|---|
| E1 | | | | | |
| 101 | 7.8367 | .8165 | Germanium | 8.3 | 8.17 |
| 102 | 11.4951 | THK 102 | air | | 7.85 |
| F1 | | | | | |
| 103 | −29.0394 | .1995 | Germanium | 2.4 | 2.30 |
| 104 | 4.3489 | THK 104 | air | | 2.22 |
| G1 | | | | | |
| 105 | 4.3489 | .4459 | Germanium | 2.4 | 2.29 |
| 106 | 132.4470 | .1884 | air | | 2.22 |
| G2 | | | | | |
| 107 | −7.4114 | .3325 | Zinc Selenide | 2.4 | 2.09 |
| 108 | −10.3786 | THK 108 | air | | 2.01 |
| H1 | | | | | |
| 109 | −9.8314 | .3076 | Germanium | 1.1 | .93 |
| 110 | 11.6629 | THK 110 | air | 1 | .88 |
| 111 | infinite | Exit Interface Plane | | | |

TABLE IV

| Magnifi- | Typical Zoom Spacings | | | |
|---|---|---|---|---|
| cation | THK 102 | THK 104 | THK 108 | THK 110 |
| 6× | 4.2808 | .1064 | 1.1443 | 1.3618 |
| 4.0× | 3.7592 | .6280 | 1.2214 | 1.2846 |
| 1.0× | 1.9936 | 2.3936 | .4066 | 2.0995 |
| 0.5× | .7297 | 3.6575 | .1064 | 2.3997 |

11. The zoom lens attachment of claim 8 wherein the lens groups are selected from the groups of germanium and zinc selenide.

12. The zoom lens attachment of claim 6 which is adapted to be mounted to an aircraft navigation system wherein the unitary magnification power can be used by the pilot to view the scene similarly to direct viewing.

13. An infrared afocal zoom telescope comprising:
a first fixed positive lens groups;
a second fixed positive lens group spaced from the first lens group;
a front negative zoom lens disposed between the first and second fixed lens groups;
a rear negative zoom lens disposed on an opposite side of the second fixed lens group; and
means for mechanically compensating the telescope by moving the zoom lenses relative to each other between a first position defining maximum magnification power wherein the front zoom lens is disposed adjacent the second fixed lens group to form a weak negative lens group, with said means moving the zoom lenses to a second position defining minimum magnification power wherein the front zoom lens is spaced from the second fixed lens group; and
whereby the lenses are selected and arranged to prevent the formation of an image between the first positive lens group and the rear negative zoom lens.

14. The telescope of claim 13 wherein said maximum magnification power is 6X and said minimum magnification power is 0.5X.

15. The telescope of claim 13 wherein the first lens group includes a lens having a rear ellipsoidal surface.

16. The telescope of claim 13 in combination with a system to aid a pilot in navigating an aircraft.

17. The telescope of claim 13 which further includes an aperture stop mounted for movement with the rear zoom lens.

18. In an afocal zoom lens attachment for use with a prime imaging lens of a fixed focal length, the improvement comprising:
four optically coacting lens groups arranged sequentially along an optical axis to form a zoom lens system, each of said lens groups having a useful spectral band pass in the infrared wavelength region, the first group being a fixed focus front objective element, the second group being a zooming element moving in a first locus, the third group being fixed and including a positive lens, and the fourth group including a negative rear zooming element moving in a second locus different from the first locus;
mechanical compensating means to continuously vary the magnification of said system between minimum and maximum limits, adapted to simultaneously move said second and fourth groups of zooming elements through said first locus and second locus, respectively; at least one locus being nonlinear;
said four groups of lenses when positioned to produce said minimum magnification of said system being arranged in relationship to each other so that the front zoom element is adjacent the fixed focus front objective element, and wherein said four groups of lenses when in the maximum magnification position are arranged so that the front zoom element of the second group is positioned adjacent the third group to form a weak negative doublet; the lenses being selected and arranged to prevent the formation of an image between the objective element and the negative rear zooming element; and
wherein the four lens groups comprise the groups A, B, C and D as shown in FIG. 1 of the drawings and wherein said lenses are fabricated and mounted in accordance with the following prescription Tables I and Ii wherein the "radius" refers to the radius of curvature of the lens surface indicated by the corresponding number, the "thickness" refers to the distance along the optical axis O from the indicated surface to the surface of next higher number, and the materials and lens outer diamters are as specified, all of the surfaces being spherical except for the objective lens whose rear surface is ellipsoidal and has a conic constant of minus 0.085256, the measured quantities being stated in inches as follows:

TABLE I

| LENS/SURFACE | RADIUS | THICKNESS | MAT'L | LENS O.D. | CLEAR APERT. |
|---|---|---|---|---|---|
| A1 | | | | | |
| 1 | 9.9246 | 1.0000 | Germanium | 10.00 | 9.82 |
| 2 | 13.5222 | THK 2 | air | | 9.37 |
| B1 | | | | | |
| 3 | 359.9160 | .2500 | Germanium | 3.20 | 2.85 |
| 4 | 6.4999 | THK 4 | air | | 2.74 |
| C1 | | | | | |
| 5 | 6.4999 | .4990 | Germanium | 3.20 | 2.77 |
| 6 | 40.9364 | .2450 | air | | 2.67 |
| C2 | | | | | |
| 7 | −12.2971 | .2500 | Zinc Selenide | 3.20 | 2.51 |
| 8 | −18.7744 | THK 8 | air | | 2.44 |
| stop | infinite | 1.7659 | air | 2.00 | 2.00 |
| D1 | | | | | |
| 9 | −5.3445 | .1200 | Germanium | 1.50 | 1.40 |
| 10 | −161.0850 | THK 10 | air | | 1.42 |
| 11 | infinite | Exit Interface Plane | | | |

TABLE II

| Magnification | Typical Zoom Spacings | | | |
|---|---|---|---|---|
| | THK 2 | THK 4 | THK 8 | THK 10 |
| 8× | 6.22513 | .09834 | .502676 | 1.7439 |
| 4.3× | 4.50180 | 1.82167 | 1.19211 | 1.0545 |
| 2.0× | 2.77848 | 3.54499 | .567035 | 1.6795 |
| 1.0× | 1.05515 | 5.26832 | .10000 | 2.1466 |

19. In an afocal zoom lens attachment for use with a prime imaging lens of a fixed focal length, the improvement comprising:
four optically coacting lens groups arranged sequentially along an optical axis to form a zoom lens system, each of said lens groups having a useful spectral band pass in the infrared wavelength region, the first group being a fixed focus front objective element, the second group being a zooming element moving in a first locus, the third group being fixed and including a positive lens, and the fourth group including a negative rear zooming element moving in a second locus different from the first locus;
mechanical compensating means to continuously vary the magnification of said system between minimum and maximum limits, adapted to simultaneously move said second and fourth groups of zooming elements through said first locus and second locus, respectively; at least one locus being nonlinear;
said four groups of lenses when positioned to produce said minimum magnification of said system being arranged in relationship to each other so that the front zoom element is adjacent the fixed focus front objective element, and wherein said four groups of lenses when in the maximum magnification position are arranged so that the front zoom element of the second group is positioned adjacent the third group to form a weak negative doublet; the lenses being selected and arranged to prevent the formation of an image between the objective element and the negative rear zooming element; and
wherein the four lens groups comprise the groups E, F, G and H as shown in FIG. 2 of the drawings and wherein said lenses are fabricated and mounted in accordance with the following prescription Tables III and IV wherein the "radius" refers to the radius of curvature of the lens surface indicated by the corresponding number, the "thickness" refers to the distance along the optical axis O from the indicated surface to the surface of next higher number, and the materials and lens outer diameters are as specified, all of the surfaces being spherical except for the objective lens whose rear surface is ellipsoidal and has a conic constant of minus 0.13882, the measured quantities being stated in inches as follows:

TABLE III

| LENS/SURFACE | RADIUS | THICKNESS | MAT'L | LENS O.D. | CLEAR APERT. |
|---|---|---|---|---|---|
| E1 | | | | | |
| 101 | 7.8367 | .8165 | Germanium | 8.3 | 8.17 |
| 102 | 11.4951 | THK 102 | air | | 7.85 |
| F1 | | | | | |
| 103 | −29.0394 | .1995 | Germanium | 2.4 | 2.30 |
| 104 | 4.3489 | THK 104 | air | | 2.22 |
| G1 | | | | | |
| 105 | 4.3489 | .4459 | Germanium | 2.4 | 2.29 |
| 106 | 132.4470 | .1884 | air | | 2.22 |
| G2 | | | | | |
| 107 | −7.4114 | .3325 | Zinc Selenide | 2.4 | 2.09 |
| 108 | −10.3786 | THK 108 | air | | 2.01 |
| H1 | | | | | |
| 109 | −9.8314 | .3076 | Germanium | 1.1 | .93 |
| 110 | 11.6629 | THK 110 | air | 1 | .88 |
| 111 | infinite | Exit Interface Plane | | | |

TABLE IV

| Magnification | Typical Zoom Spacings | | | |
|---|---|---|---|---|
| | THK 102 | THK 104 | THK 108 | THK 110 |
| 6× | 4.2808 | .1064 | 1.1443 | 1.3618 |
| 4.0× | 3.7592 | .6280 | 1.2214 | 1.2846 |
| 1.0× | 1.9936 | 2.3936 | .4066 | 2.0995 |
| 0.5× | .7297 | 3.6575 | .1064 | 2.3997 |

\* \* \* \* \*